(12) United States Patent
Zante et al.

(10) Patent No.: US 10,509,737 B2
(45) Date of Patent: Dec. 17, 2019

(54) DATA PROCESSING SYSTEM FOR A GRAPHICAL INTERFACE AND GRAPHICAL INTERFACE COMPRISING SUCH A DATA PROCESSING SYSTEM

(71) Applicant: Zodiac Aero Electric, Montreuil (FR)

(72) Inventors: Etienne Denis Marie Zante, Bourg-la-Reine (FR); Rémi Andreoletti, Chelles (FR)

(73) Assignee: Zodiac Aero Electric, Montreuil (FR)

( * ) Notice: Subject to any disclaimer, the term of this patent is extended or adjusted under 35 U.S.C. 154(b) by 98 days.

(21) Appl. No.: 14/667,852

(22) Filed: Mar. 25, 2015

(65) Prior Publication Data
US 2015/0287157 A1  Oct. 8, 2015

Related U.S. Application Data

(60) Provisional application No. 61/976,078, filed on Apr. 7, 2014.

(30) Foreign Application Priority Data

Jul. 21, 2014  (FR) ...................................... 14 57007

(51) Int. Cl.
*G06F 13/12* (2006.01)
*G06F 13/40* (2006.01)
*G06T 1/20* (2006.01)

(52) U.S. Cl.
CPC ........ *G06F 13/124* (2013.01); *G06F 13/4068* (2013.01); *G06T 1/20* (2013.01); *G06T 2210/52* (2013.01)

(58) Field of Classification Search
CPC .............................. G06T 1/20; G06T 2210/52
USPC ......................................................... 345/505
See application file for complete search history.

(56) References Cited

U.S. PATENT DOCUMENTS

| 2011/0169840 A1* | 7/2011 | Bakalash | G06T 1/00 345/505 |
| 2015/0178879 A1* | 6/2015 | Palmer | G06F 9/505 345/506 |

OTHER PUBLICATIONS

"PCI Express". Wikipedia. https://web.archive.org/web/20140331013921/https://en.wikipedia.org/wiki/PCI_Express, Archive Date: Mar. 31, 2014, Accessed on Jun. 6, 2017.*

* cited by examiner

*Primary Examiner* — Shivang I Patel
(74) *Attorney, Agent, or Firm* — Meyertons, Hood, Kivlin, Kowert & Goetzel, P.C.; Mark R. DeLuca

(57) ABSTRACT

A data processing system for a graphical interface includes at least one graphics processing unit (GPU) and at least one central processing unit (CPU) which communicates with the graphics processing unit, said processing unit and said central processing unit each including a group of data processing cores (C1, . . . , C6, C'1, . . . C'6). The data processing cores of the graphics processing unit are each connected to a data processing core of the central processing unit via a single dedicated bus (B1, . . . , B6) in such a way as to carry out a data transfer in parallel between said graphics processing unit and said central processing unit.

10 Claims, 3 Drawing Sheets

DATA PROCESSING SYSTEM FOR A GRAPHICAL INTERFACE AND GRAPHICAL INTERFACE COMPRISING SUCH A DATA PROCESSING SYSTEM

PRIORITY CLAIM

This application claims priority to U.S. Provisional Application Ser. No. 61/976,078 filed Apr. 7, 2014 and French Patent Application No. 1457007 filed Jul. 21, 2014, which are incorporated herein by reference in their entirety.

BACKGROUND OF THE INVENTION

1. Field of the Invention

The present invention relates to data processing systems for a graphical interface and relates in particular to data processing systems based on the use of a graphics processing unit (GPU) which is able to interwork with a central processing unit (CPU). The present invention also relates to a man-machine interface using such a processing system. One particularly interesting application of the invention relates to data processing systems for man/machine interfaces installed on-board aircraft.

2. Description of the Relevant Art

A need in fact exists to have touch-sensitive man/machine interfaces on-board aircraft.

In the field of graphical interfaces, data processing systems are conventionally used to perform graphics processing operations and create graphical content intended to be displayed on a screen of the interface. This may involve, in particular, creating graphical content comprising manually manipulable touch areas, in this case by a pilot, for the performance of predefined functions.

In the prior art, data processing architectures can generally be implemented in the form of single-core CPUs, multiple central processing units (multi-CPUs) or multi-core CPUs. For the implementation of graphics processing, predominantly multi-core architectures are used and, in particular, graphics processing units are used that interwork with a central processing unit to increase processing power.

In the case of single-core CPUs, the basic component of an architecture of this type is the processor, which is a component enabling the interpretation of machine instructions defining computer programs.

As is known, in order that a system integrating a processor can operate, it is connected to a permanent storage device which enables the storage of the program that is to be run, to a fast memory for reading and writing the variables used in the running of the programs, and to peripherals of the input/output, communication bus, memory controller, etc., type enabling the exchange of data with the outside of the system.

Modern processors integrated on a chip also integrate a communication bus and very fast cache memory for the storage, as close as possible to the program running area, of the variables used by the program, only the relatively large or least-used variables being sent to the fast memory.

In addition to the processor, Systems on Chip (SoCs) integrate a certain number of peripherals.

Finally, microcontrollers are chips that integrate all of the elements necessary for the operation of the processor, i.e. memory and peripherals.

In the case of single-core CPUs, increasing performance requirements for the processors tend to increase progressively the frequency of operation, made possible by the ever-increasing etching fineness of the silicon. However, the increase in frequency also causes a very substantial increase in consumption, in such a way that the gain in performance becomes marginal in the face of the increase in consumption. It has therefore been proposed to replicate the processing cores in order to parallelize the running of a program, but without increasing the operating frequency.

In a conventional multi-core CPU architecture, each core has a first level of cache memory, referred to as the first-level cache memory. The different cores can then share a different cache memory, referred to as the second-level cache memory. A third level of cache memory can be provided when some cores are to be combined.

The parallelization of tasks and the allocation of the instructions to be carried out to one or the other of the cores are performed via the set of instructions interpreted by the processor and by the implemented operating system (OS) which can allocate a given task according to the different cores. This is then referred to as a multi-core SoCs.

Another strategy consists in providing an architecture similar to the conventional architecture but, instead of parallelizing the operation, the different cores are used to render the processing more reliable. The cores execute the same instructions to within a clock pulse, and the processing operations are then compared in order to obtain a reliable operation under critical conditions. This strategy is known by the name of "Lockstep".

Another strategy consists in replicating a system rather than a core. This is then referred to as a multiprocessor. Each processor is independent and does not share a cache memory with the others. This type of architecture is generally set up externally in order to implement supercomputers or groups of networked servers to perform relatively complex processing operations requiring substantial processing resources.

In the case of GPU architectures, the graphics processing units, in the same way as CPUs, are processing architectures executing a set of instructions. However, a GPU is a processor optimized for graphics processing operations such as hardware acceleration, three-dimensional processing, video decoding, etc.

GPUs have for a long time consisted of multiple processing cores which distribute graphics tasks among themselves. This involves parallel-processing architectures. As previously indicated, GPUs are predominantly multi-core units and may comprise more than 1000 cores, in the case of the most powerful. A certain number of processing operations are allocated to the different cores, to be performed by a controller.

In the case of data processing systems intended to be installed on-board aircraft, as will be understood, this type of electronic system is subject to severe constraints in terms of control of the equipment used, and of determinism, making it necessary to determine with certainty the operation of the system, for example concerning the data transfer duration. They require a validation and certification by the competent authorities. Data processing systems for the on-board man-machine interfaces for commercial aircraft must therefore comply with a certain number of development recommendations and rules.

In the prior art, on-board processing systems are generally implemented on the basis of "Commercial Off The Shelf" (COTS) components, i.e. components that are mass-produced in order to reduce production and maintenance costs. However, the use of conventional COTS components firstly causes problems of obsolescence, making it necessary to procure a large number of components and store them in order to guarantee the maintainability of the product. Given the development time and service life of a product for the aeronautical industry, which may amount to several decades, it is often the case that the components used in the design of an electronic system are in fact obsolete even before the end of the design process, making it necessary to implement periodic modification and recertification phases.

Secondly, the COTS electronic components are generally derived from consumer markets or from the telecommunications sector and are then optimized for non-aeronautical applications. Their use in the aeronautical field involves the deactivation of the original applications, their modification to make them compatible with the aeronautical field, then a certification, incurring additional costs.

Furthermore, standard multicore systems comprise only peripheral systems and memories shared among the different processing cores. This results in a requirement for arbitration in the potentially concurrent access to said peripheral systems. This concurrent access is managed in a conventional COTS system by an uncontrolled coherence system. The use of COTS components in an aeronautical system therefore requires the implementation of a large number of software and hardware locks to guarantee the operation of the components while following the recommendations of the certification authorities. The addition of these locks entails a substantial degradation in the performance of the central data processing units.

Furthermore, conventional graphics processing units use programming interfaces using normalized openGL ("Open Graphics Library") processing functions to create prototype interfaces which, after validation, are reprocessed by software tools compatible with the aeronautical field in order to produce the final interface. This results in a modification of the original interface so that, following reprocessing, the final interface installed in a cockpit may be substantially different from the interface originally developed and validated by end users.

SUMMARY OF THE INVENTION

In the light of the description above, the embodiments described herein include a data processing system for a graphical interface which overcomes the aforementioned disadvantages and, in particular, include a data processing architecture suitable for the critical field of aeronautics.

In a first embodiment, a data processing system for a graphical interface includes at least one graphics processing unit and at least one central processing unit which communicates with the graphics processing unit, said processing unit and said central processing unit each including a group of data processing cores.

According to a general characteristic of the data processing system, the data processing cores of the graphics processing unit are each connected to a data processing core of the central processing unit via a single dedicated data transfer means in such a way as to implement a data transfer in parallel between said graphics processing unit and said central processing unit.

In other words, the embodiments herein enable an optimization of processing power for the purpose of use in aeronautics by multiplying the CPU/GPU processing cores in order to obtain a cloned architecture having the same task parallelization advantages as a multicore architecture, without the disadvantages of complexity and shared resources which are not conceivable for reasons of aeronautical safety and criticality.

In another embodiment, at least some of the data processing cores each include a processing core performing the execution of instructions on the data and a local internal data transfer means connected to peripheral devices each dedicated to one processing core.

The data processing cores may be interconnected via a global internal data transfer means to said graphics processing unit or to said central processing unit and may be connected to peripheral devices shared between the data processing cores.

The processing systems may furthermore include arbitration means to arbitrate access to the peripheral devices shared among the data processing cores.

In one embodiment, the arbitration means includes a scheduler periodically and successively allocating a time interval to each core during which said core is authorized to communicate with the shared peripheral devices via the global bus.

The system may also include a global operating system shared among a plurality of processing cores.

According to another embodiment, the system includes means for combining the outputs of each processing core of the graphics processing unit.

In a further embodiment, a graphical interface for an aircraft cockpit includes a data processing system as defined above.

BRIEF DESCRIPTION OF THE DRAWINGS

Other objects, characteristics and advantages of the invention will become apparent from a reading of the detailed description which follows, given purely by way of a non-limiting example, with reference to the attached drawings, in which.

Figure 1:
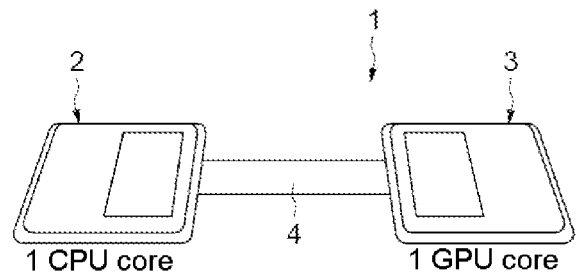
FIGS. 1 to 3 show examples of the implementation of connections between a CPU and a GPU, according to the prior art.

While the invention may be susceptible to various modifications and alternative forms, specific embodiments thereof are shown by way of example in the drawings and will herein be described in detail. The drawings may not be to scale. It should be understood, however, that the drawings and detailed description thereto are not intended to limit the invention to the particular form disclosed, but to the contrary, the intention is to cover all modifications, equivalents, and alternatives falling within the spirit and scope of the present invention as defined by the appended claims.

DETAILED DESCRIPTION OF THE PREFERRED EMBODIMENTS

It is to be understood the present invention is not limited to particular devices or methods, which may, of course, vary. It is also to be understood that the terminology used herein is for the purpose of describing particular embodiments only, and is not intended to be limiting. As used in this specification and the appended claims, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected.

Figure 2:
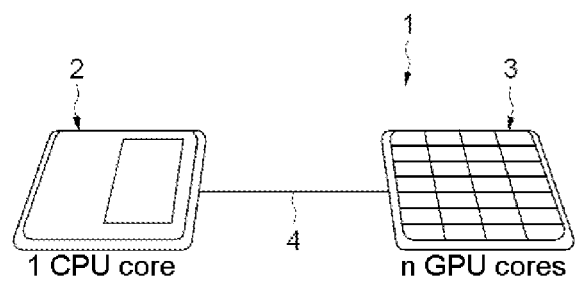
Figure 3:
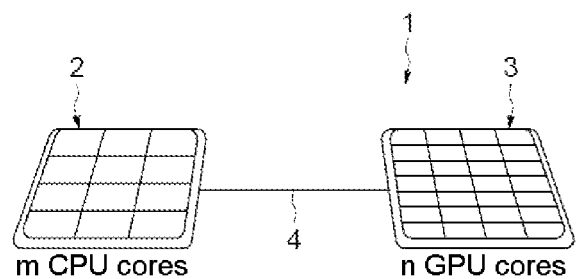

Reference is first made to FIGS. 1 to 3 which show different configurations of a single-core or multicore CPU/GPU architecture 1 according to the prior art.

As can be seen, in the prior art, each central processing unit (CPU) 2 communicates with its associated graphics processing unit (GPU) 3 via a single global communication bus 4 shared among the cores.

In various configurations, this may involve a single-core CPU and a single-core GPU (FIG. 1), a single-core CPU and a multicore GPU (FIG. 2), or multicore CPU and a multicore GPU, having m cores and n cores respectively.

According to one such arrangement in which the communication bus is common to the cores of the central processing unit CPU and the graphics processing unit GPU, when one core of the central processing unit CPU runs a software application, it operates all of the cores of the GPU processor.

Furthermore, the cores of the GPU processor are shared, which notably entails a simultaneous updating and certification of all of the cores.

The use of a global bus furthermore requires the provision of an extensive arbitration in order to authorize access to the processor. However, the data transfer time on the common bus is not guaranteed. In particular, when the number of cores increases, the management of priorities and the calculation of access times becomes more complex to perform. In addition, the number of inputs and outputs is limited.

The deterministic operation of this type of component, notably concerning the data transfer time, which cannot be determined with certainty, is therefore not guaranteed.

Figure 4:
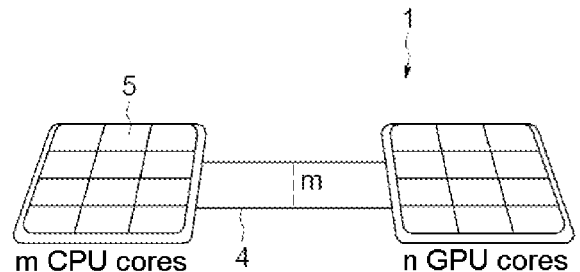
FIG. 4 shows a method of connection between a CPU and a GPU.

FIG. 4 shows a CPU/GPU architecture according to the invention which enables these disadvantages to be overcome.

As can be seen, the CPU and the GPU are multicore units here, having m cores 5, the cores being connected in CPU/GPU pairs via a dedicated data transfer means 6, for example a group of m buses, as shown, or a "Network on Chip" (NoC).

In the example shown, the GPU processors are independent and are each connected to a single CPU core via a dedicated bus. Each GPU core produces a graphics image linked to the application which it manages. The different images produced are then assembled by a mixer, ultimately to produce a screen image which is intended to be displayed on the screen of a man-machine interface.

Each CPU/GPU pair thus hosts a graphics application distinct and independent from the others. This architecture therefore enables the development in parallel and by a plurality of suppliers of man-machine interface applications for different commercial avionics systems. This entirely partitioned architecture enables the implementation of an incremental certification. In other words, it is possible to update one core without impacting on the others.

Figure 5:
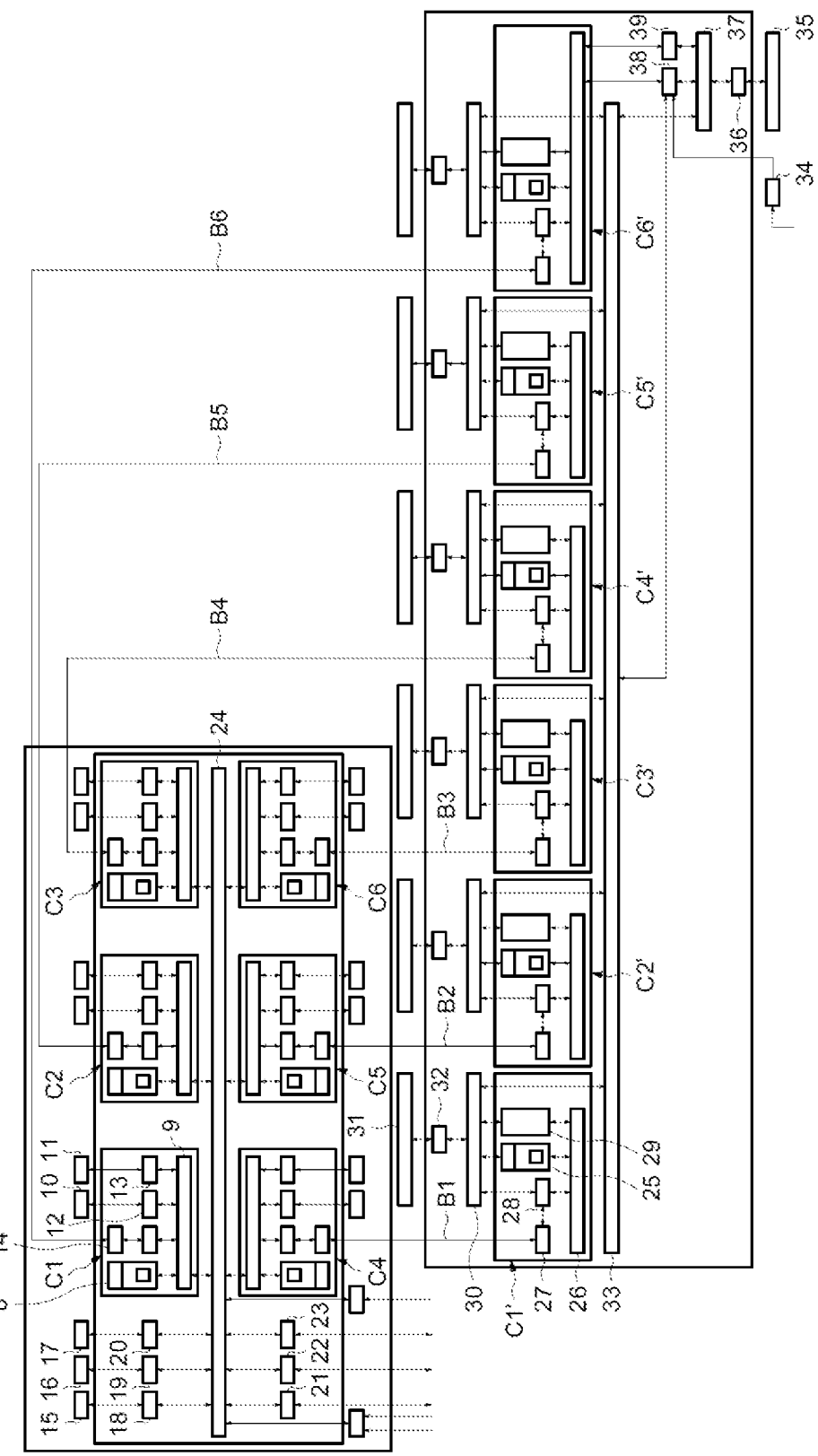
FIG. 5 shows the general architecture of a data processing system.

FIG. 5 shows the general architecture of a data processing system, for a graphical interface, based on the connection between a graphics processing unit GPU and a central processing unit CPU using a dedicated bus. As previously indicated, the implementation of the connection, in a general manner, via a data transfer means, does not exceed the scope of the invention.

This figure in fact shows that the central processing unit CPU and the graphics processing unit GPU each comprise a group of data processing cores C1-C6 and C'1-C'6 respectively, in this case six in number, interconnected via dedicated buses B1-B6 or, in a general manner, a dedicated data transfer means.

The problems of arbitration and non-guaranteed data transfer time no longer arise in this architecture, the data being transported between the processing cores on non-shared buses.

As can be seen, the data processing cores of the central processing unit are organized on the same model and are based on the use of one processing core, such as 8. Each processing core comprises an internal communication bus 9 or, in a general manner, a data transfer means, which performs the communication within the core between the various components which make it up and with local peripheral devices.

Each processing core in fact comprises different types of memory with, inter alia, a permanent memory 10, for example a Flash memory, and a random access memory 11, for example a DDR memory, associated with a permanent memory controller 12 and a random access memory controller 13. Obviously, equipping the processing cores with other types of local peripheral device, notably other types of memory, does not exceed the scope of the invention. As will be described with reference to FIG. 4, each processing core also comprises a certain number of local data input and output peripherals which may differ from one core to the other.

Communication peripherals 14 perform the communication between the dedicated buses B1-B6 and the associated internal communication bus 9.

Alongside the memories 10 and 11 dedicated to each processing core, the central processing unit CPU furthermore comprises global memories and peripherals shared among the cores. This involves, in particular, the memories 15, 16 and 17 associated with their respective memory controllers 18, 19 and 20. By way of illustration, but in a non-limiting manner, this involves Flash memories, DDRs or global shared peripherals 21, 22 and 23, for example ARINC 429 or ARINC 825. In the proposed application, which relates to graphical interfaces for cockpit equipment for aircraft, memories of this type may, for example, be used for recording information relating to a flight.

A global internal bus 24 or, in a general manner, a data transfer means, performs the exchange of data between the data processing cores C1-C6, with the memories 15, 16 and 17 and with the global peripheral devices 21, 22 et 23.

The data processing cores C'1-C'6 of the graphics processing unit have a similar structure and are based on the use of a processing core such as 25. This processing core 25 communicates with an internal communication bus 26 or, in a general manner, with a data transfer means, which is connected via communication links 27 and 28 to the dedicated buses B1-B6.

Alongside the processing core 25, each data processing core C'1-C'6 furthermore incorporates a GPU graphics processing core 29 connected to the internal bus 26. Finally, a local bus 30 or, in a general manner, a data transfer means, which communicates with the communication links 27 and 28, with the processing core 25 and with the GPU processing core 29, is linked to an external local memory 31 associated with a corresponding controller 32.

Furthermore, the graphics processing unit GPU comprises a mixer 33 connected to the local bus 30 of each data processing unit C'1-C'6.

In fact, each CPU/GPU pair performs a task which is allocated to it and generates a portion of the final image. The mixer 33 combines these various images to produce the final screen displayed on the man-machine interface. Optionally, the processing system that has just been described may be equipped with a video input 34, an external memory 35 associated with a corresponding controller 36 and with an arbitration system 37 for accessing external shared data. An image retrieval device 38 associated with a flow manager 39 combines videos or images retrieved from the input 34 or the memory 35 in order to generate the final image.

As will be understood, the architecture that has just been described can be likened to a multiprocessor architecture integrated onto one and the same chip. In fact, since each core is independent and has its own dedicated memory controllers and peripherals, the architecture according to the invention is similar to a multi-SoC architecture.

Figure 6:
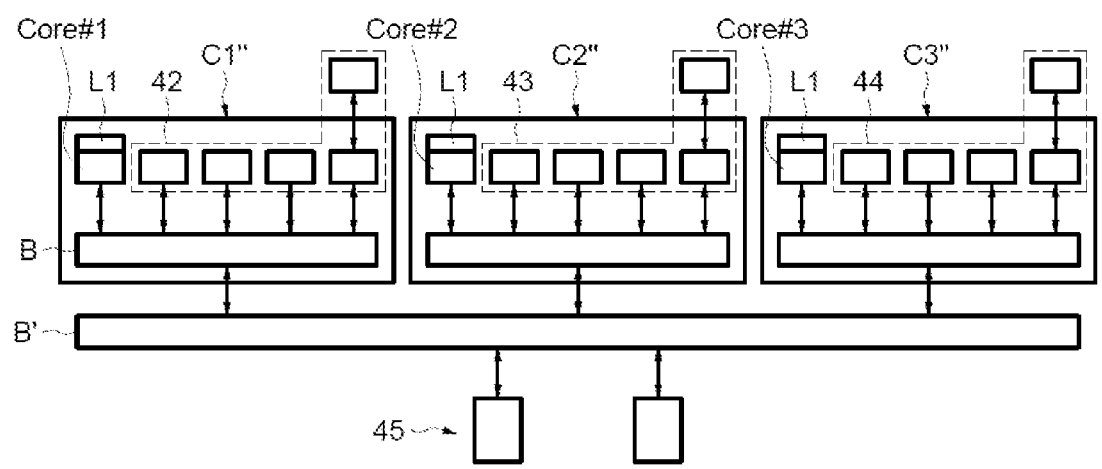
FIG. 6 shows a part of a data processing system showing the use of peripherals dedicated to each processing core and shared peripheral devices.

With reference to FIG. 6, which shows a strategy for installing an operating system in a data processing system according to the invention, it can be seen that each processing core, denoted C"1, C"2 or C"3, incorporates a certain number of Input/Output interfaces such as 42, 43 or 44 which communicate with a core "core#1", "core#2" or "core#3" via a local bus B, while other Input/Output interfaces 45 are shared among the processing cores with which they communicate via a common interface bus B'. This strategy may apply equally to both the central processing unit and the graphics processing unit. In other words, two Input/Output interface levels are provided here, the architecture integrating not only Input/Output interfaces dedicated to each core for accessing dedicated peripherals, but also global Input/Output interfaces which are shared among the cores for accessing shared peripherals.

It will be understood that the direct-access local I/O interfaces, without sharing and without arbitration, enable faster access to local peripherals dedicated to one core, whereas the global I/O interfaces enable access to peripherals shared among the cores.

The deterministic access to the shared resources makes the use of a controlled shared access bus 24 (FIG. 5) desirable.

The bus 24 is thus associated with arbitration means serving to arbitrate the data exchanges with the shared devices or, in other words, to arbitrate access by the cores to the shared resources. By way of example, these arbitrations may take the form of a scheduler, for example integrated into the bus, periodically allocating communication times for each core in succession.

Further modifications and alternative embodiments of various aspects of the invention will be apparent to those skilled in the art in view of this description. Accordingly, this description is to be construed as illustrative only and is for the purpose of teaching those skilled in the art the general manner of carrying out the invention. It is to be understood that the forms of the invention shown and described herein are to be taken as examples of embodiments. Elements and materials may be substituted for those illustrated and described herein, parts and processes may be reversed, and certain features of the invention may be utilized independently, all as would be apparent to one skilled in the art after having the benefit of this description of the invention. Changes may be made in the elements described herein without departing from the spirit and scope of the invention as described in the following claims.

What is claimed is:

1. A data processing system for a graphical interface comprising:
at least one graphics processing unit (GPU) and at least one central processing unit (CPU) configured to communicate with the GPU, said GPU and said CPU each including a corresponding plurality of data processing cores, wherein each of the data processing cores of the GPU are connected to a corresponding one of the data processing cores of the CPU via a corresponding bus dedicated exclusively to communications between the one of the data processing cores of the GPU and the one of the data processing cores of the CPU to form pairs of processing cores, wherein the pairs of processor cores are configured to conduct a data transfer in parallel with each other, via their corresponding bus, between said GPU and said CPU, wherein each pair of processing cores is configured to host a graphics application distinct and independent from the others, perform a task which is allocated to it and generate a portion of a final image.

2. The system according to claim 1, wherein at least some of the data processing cores each comprise at least one processing core performing the execution of instructions on the data and a local internal data transfer bus connected to peripheral devices, each dedicated to one processing core.

3. The system according to claim 2, wherein the data processing cores of the CPU are interconnected to one another via a global internal bus and are further connected to peripheral devices shared between the data processing cores via the global internal bus.

4. The system according to claim 3, further comprising an arbitration system to arbitrate access to the peripheral devices shared among the data processing cores.

5. The system according to claim 1, further comprising a global operating system shared among a plurality of processing cores.

6. A graphical interface for an aircraft cockpit comprising a data processing system comprising at least one graphics processing unit (GPU) and at least one central processing unit (CPU) which communicates with the GPU, said GPU and said CPU each including a corresponding plurality of data processing cores, wherein each of the data processing cores of the GPU are connected to a corresponding one of the data processing cores of the CPU via a corresponding bus dedicated exclusively to communications between the one of the data processing cores of the GPU and the one of the data processing cores of the CPU to form pairs of processing cores, wherein the pairs of processor cores are configured to conduct a data transfer in parallel with each other, via their corresponding bus, between said GPU and said CPU, wherein each pair of processing cores is configured to host a graphics application distinct and independent from the others, perform a task which is allocated to it and generate a portion of a final image.

7. The graphical interface according to claim 6, wherein at least some of the data processing cores each comprise at least one processing core configured to perform the execution of instructions on the data and a local internal data transfer bus connected to peripheral devices, each dedicated to one processing core.

8. The graphical interface according to claim 6, wherein the data processing cores of the CPU are interconnected to one another via a global internal bus and are connected to peripheral devices shared between the data processing cores via the global internal bus.

9. The graphical interface according to claim 8, further comprising an arbitration system to arbitrate access to the peripheral devices shared among the data processing cores.

10. The graphical interface according to claim 6, further comprising a global operating system shared among a plurality of processing cores.

* * * * *